(12) United States Patent
Brown

(10) Patent No.: US 8,009,874 B2
(45) Date of Patent: Aug. 30, 2011

(54) USER VALIDATION OF BODY WORN DEVICE

(75) Inventor: William Owen Brown, Santa Cruz, CA (US)

(73) Assignee: Plantronics, Inc., Santa Cruz, CA (US)

(*) Notice: Subject to any disclaimer, the term of this patent is extended or adjusted under 35 U.S.C. 154(b) by 1054 days.

(21) Appl. No.: 11/891,370

(22) Filed: Aug. 10, 2007

(65) Prior Publication Data

US 2009/0041313 A1 Feb. 12, 2009

(51) Int. Cl.
*G06K 9/00* (2006.01)
(52) U.S. Cl. .................................. 382/115; 382/124
(58) Field of Classification Search .............. 382/115, 382/124
See application file for complete search history.

(56) References Cited

U.S. PATENT DOCUMENTS

| | | | |
|---|---|---|---|
| 5,697,099 A * | 12/1997 | Siska et al. ............................ | 2/5 |
| 2002/0163601 A1 * | 11/2002 | Min et al. ........................ | 349/33 |
| 2003/0130016 A1 | 7/2003 | Matsuura et al. | |
| 2003/0147651 A1 * | 8/2003 | Roes et al. .................... | 398/108 |
| 2003/0169910 A1 * | 9/2003 | Reisman et al. ............. | 382/124 |
| 2005/0269402 A1 | 12/2005 | Spitzer et al. | |
| 2006/0052136 A1 | 3/2006 | Harris | |
| 2008/0080705 A1 | 4/2008 | Gerhardt | |

FOREIGN PATENT DOCUMENTS

WO 2008/008101 A2 1/2008

OTHER PUBLICATIONS

International Search Report in PCT/US2008/009601, mailed on Dec. 12, 2008.
Written Opinion of the International Searching Authority in PCT/US2008/009601, mailed on Dec. 12, 2008.
Gregory, Peter; Doria, Tom; Stegh, Chris; Su, Jim; SIP Communications for Dummies, Avaya Custom Edition, 2006, Wiley Publishing, Inc., Hoboken, NJ, USA.

* cited by examiner

*Primary Examiner* — Tom Lu
(74) *Attorney, Agent, or Firm* — The Intellectual Property Law Office of Thomas Chuang

(57) ABSTRACT

A headset includes a detector providing an output indicating a donned or doffed condition, a memory storing a fingerprint data of an authorized headset user, and a fingerprint scanner for generating a fingerprint scan upon detecting a donned condition. The headset includes a finger pad on an exterior of the headset on which a fingerprint of a headset wearer is placed during a validation process and a processor for processing the fingerprint scan to validate the identity of a headset user.

35 Claims, 15 Drawing Sheets

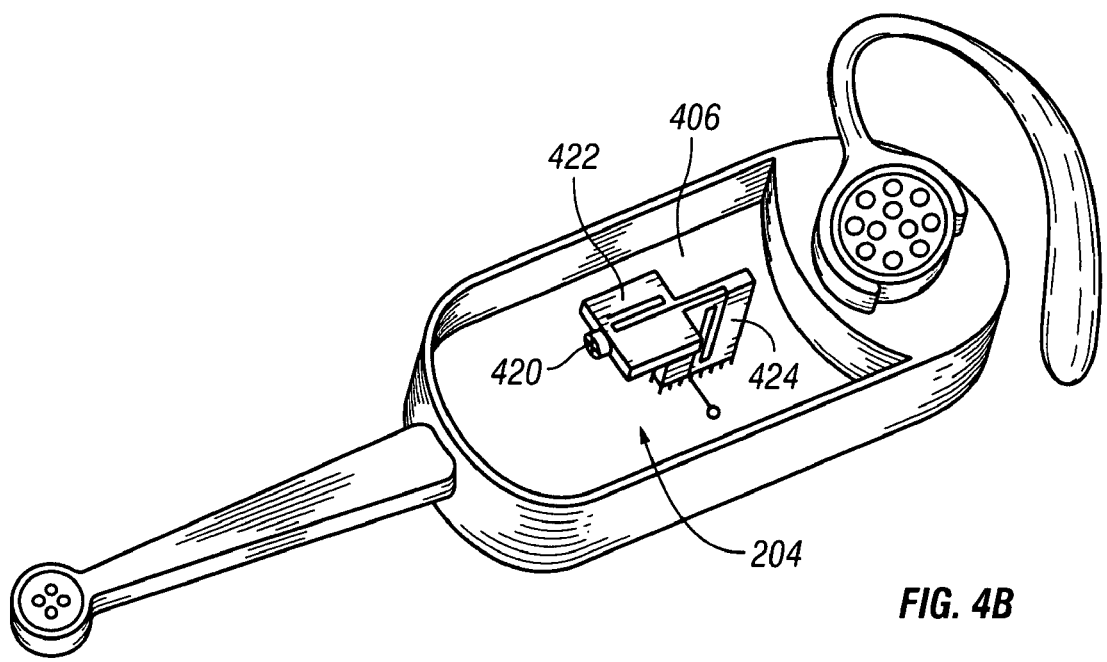
FIG. 4B
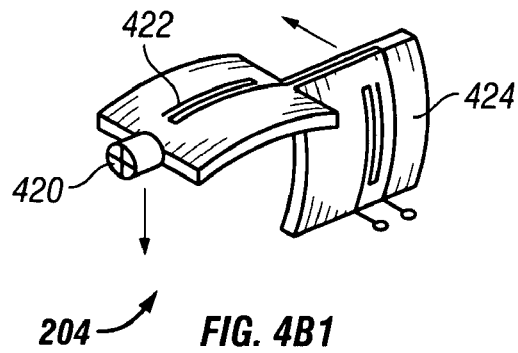
FIG. 4B1
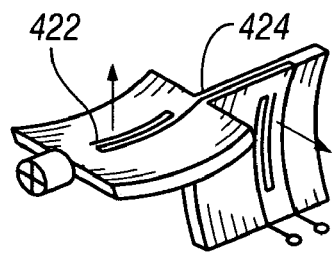
FIG. 4B2

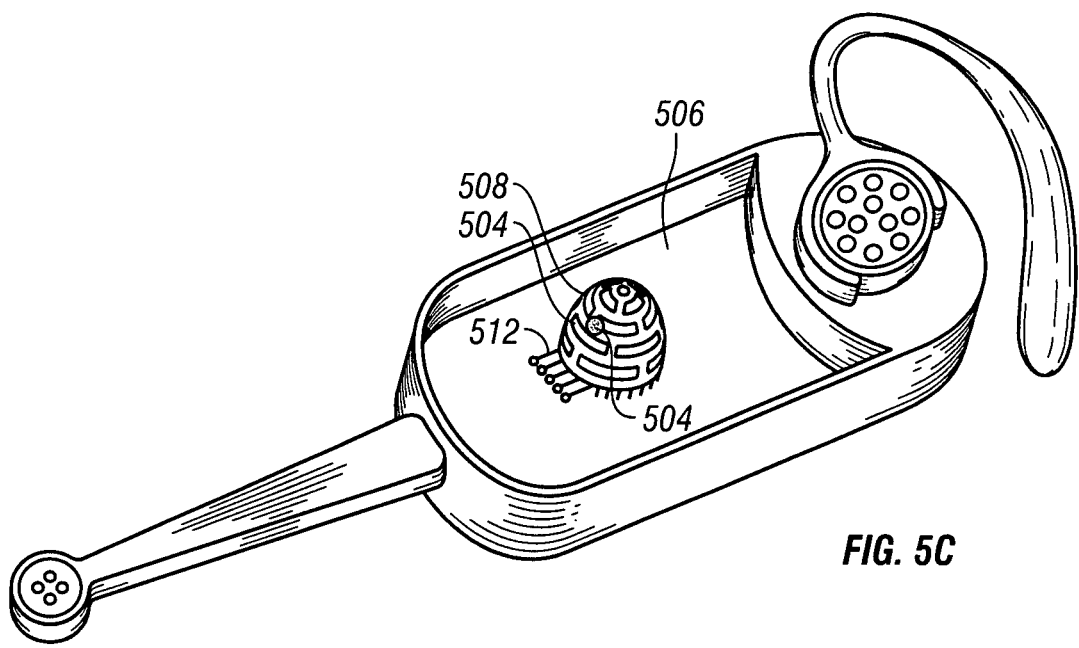
FIG. 5C
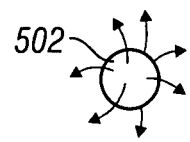
FIG. 5C1
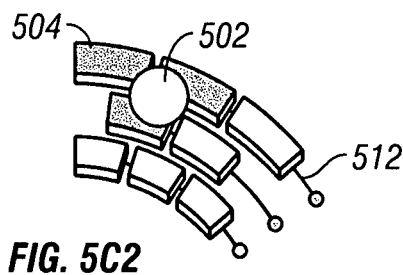
FIG. 5C2
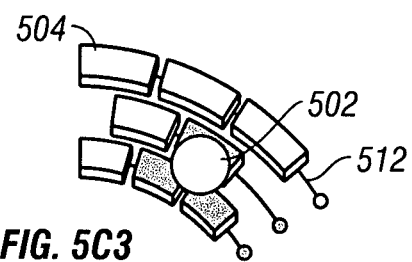
FIG. 5C3

USER VALIDATION OF BODY WORN DEVICE

BACKGROUND OF THE INVENTION

As headsets become more "intelligent", offering advanced features and functionality, they store and utilize increased quantities of user specific information. Such user specific information includes listening preferences such as volume, tone, and audio equalization. User specific information also includes, for example, passwords, telephone directories, and network or device identities to communicate with.

In the prior art, there was limited need for headset user validation since the scope of features and functionality was limited. However, with the recent advent of more advanced headset, if the headset does not authenticate that the person who wears the headset is indeed the authorized user to which this information pertains, then the person wearing the headset may be able to gain access to user specific information without the authorized user's permission or knowledge. This unauthorized access is particularly dangerous where an intelligent headset may permit an unauthorized wearer to gain access to the valid owner's e-mail, contact lists, voice mail, or other private information.

Furthermore, in addition to privacy concerns, unauthorized headset use may pose safety concerns as well. For example, some of the headset settings may potentially be damaging to the wearer, such as the case where the authorized user is hard of hearing and has a volume preference that is high enough to be potentially damaging to anyone else who uses the headset. It would therefore be desirable to prevent unsuspecting wearer's of the headset from being able to operate the headset.

As a result, there is a need for improved methods and apparatuses for headset usage and user validation.

BRIEF DESCRIPTION OF THE DRAWINGS

The present invention will be readily understood by the following detailed description in conjunction with the accompanying drawings, wherein like reference numerals designate like structural elements.

FIG. 1 shows a system including a headset server and a headset (wired or wireless) capable of indicating a donned or doffed state of the.

DESCRIPTION OF SPECIFIC EMBODIMENTS

Figure 1:
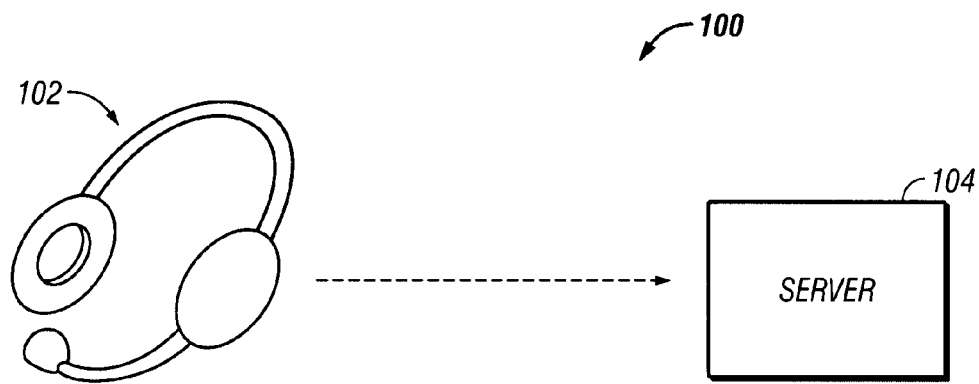

Methods and apparatuses for headset user validation are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates generally to the field of intelligent headsets and specifically to the field of headsets that contain or allow access to user specific information. In one example, this description describes a method and apparatus for a headset with user validation (also referred to herein as user authentication). The user validation process is activated upon detection of a particular headset usage status, such as when the headset state shifts from a not worn (doffed) state to a worn state (donned or also referred to herein as "DON"). The headset includes a detector for determining whether the headset is donned or doffed, and when the headset shifts from being doffed to donned or vice versa.

User validation is accomplished using a fingerprint scanner on the headset. A variety of fingerprint scanners may be used, such as ultrasound, capacitive, and optical scanning. For example, an optical fingerprint scanner is integrated into the headset. In a further example, an optical line scanner is used to perform the fingerprint authentication. The headset includes a fingerprint input device and a processor running fingerprint identification software. The software initially captures and stores the key identifying elements of the user's fingerprint and performs pattern matching upon headset DON to ensure that the fingerprint of the user matches that originally stored.

The herein described methods and systems provide several advantages over the prior art. Secure authentication is achieved with high reliability and unauthorized use is prevented. In an example where the fingerprint scanner is a line scanner, the line scanner is smaller and lighter than typical optical scanners used for fingerprint scanning. In one example, the validation apparatus and method is self-contained and does not require a separate server, which may be useful in remote applications. Where the headset is used for presence applications, validation of the headset user increases reliability of the presence information.

In one example of the invention, a headset includes a detector providing an output indicating a donned or doffed condition and a memory storing a fingerprint data of an authorized headset user. A finger pad is located on an exterior of the headset, on which a fingerprint of a headset wearer is placed during a validation process. The headset further includes a fingerprint scanner for generating a fingerprint scan upon detecting a state change from a doffed condition to a donned condition, and a processor for processing the fingerprint scan to validate the identity of a headset user. Upon validation, one or more headset functions requiring validation are unlocked.

Upon detection of a state change from a donned condition to a doffed condition, any previous validation of the headset is terminated, and any headset functions requiring validation are locked from use.

In one example of the invention, a method for validating the identity of a headset wearer includes detecting kinetic energy, temperature or capacitance to determine a headset characteristic, processing the headset characteristic to determine a donned or doffed condition, generating a fingerprint scan using a headset fingerprint scanner, and processing the fingerprint scan to validate the identity of a headset wearer.

In one example of the invention, a headset includes a detector providing an output indicating a donned or doffed condition, a memory storing a fingerprint data of an authorized headset user, and a fingerprint scanner for generating a fingerprint scan upon detecting a donned condition. The headset includes a finger pad on an exterior of the headset on which a fingerprint of a headset wearer is placed during a validation process and a processor for processing the fingerprint scan to validate the identity of a headset user.

Referring now to FIG. 1, a system 100 includes a headset 102 and a headset server 104 operably coupled together. Other elements may be between headset 102 and server 104, such as but not limited to, adaptors, access points, and/or networks. It is noted that server 104 may be used to route calls to multiple headsets, for example, at a call center.

Headset 102 may be wired or wireless. In one example, headset 102 may be wired to an adaptor which is coupled to a network, or headset 102 may be wirelessly coupled to an access point (AP) (not shown), which is operably coupled with a network. In one example, the network may be a communications network which may include a public switched telephone network (PSTN), an integrated services digital network (ISDN), a local area network (LAN), and/or a wireless local area network (WLAN), that support standards such as Ethernet, wireless fidelity (WiFi), and/or voice over internet protocol (VoIP).

In one example, an AP includes a transceiver and a processor configured to allow a wireless device (e.g., a headset) access to a network connected to the access point (e.g., via a 10/100 Ethernet RJ-45 port). An AP may be any device that allows wireless-equipped computers and other devices to communicate with a wired network. In one example, an AP is able to support WiFi in general, and the 802.11a, 802.11b, and/or 802.11g wireless networking standards in particular. In other examples, the AP may be able to support other wireless networking standards.

Figure 2:
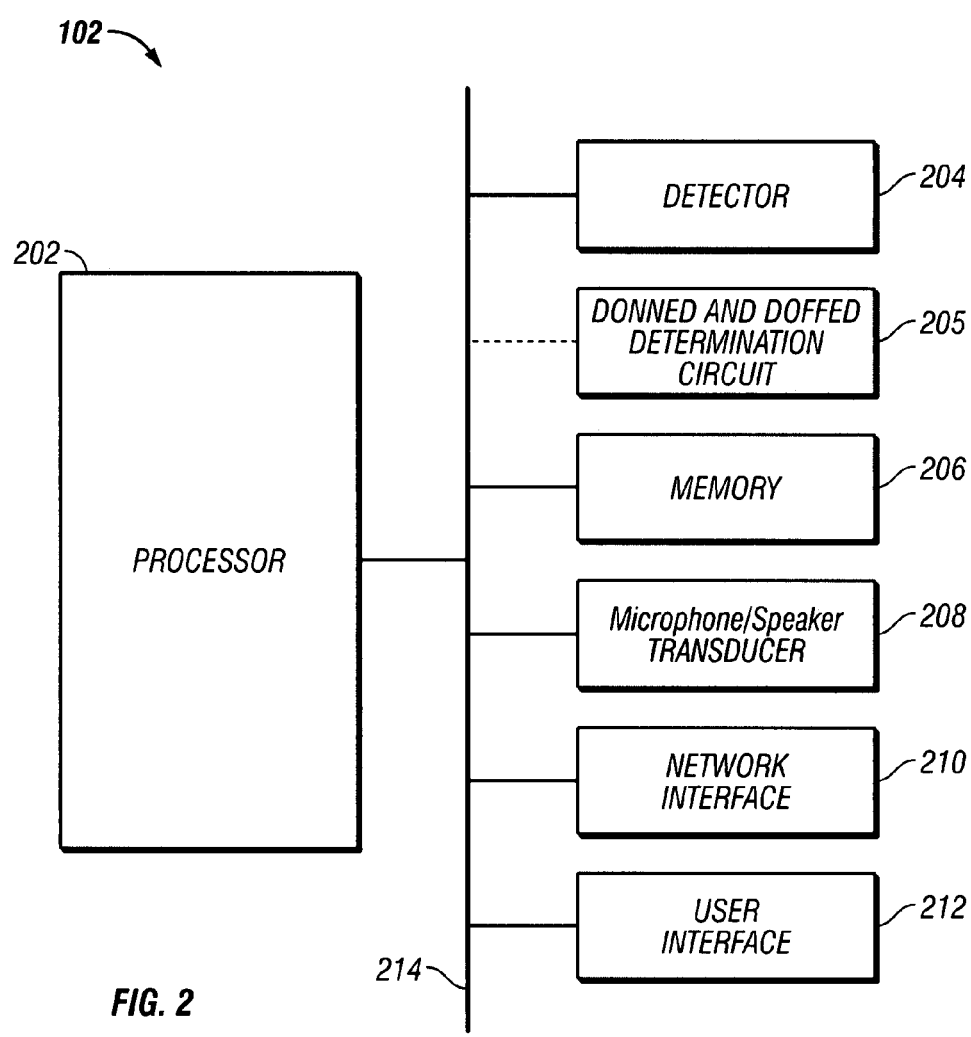
FIG. 2 shows a block diagram of a headset capable of indicating a donned or doffed state.

Referring now to FIG. 2 in conjunction with FIG. 1, a block diagram of an example of headset 102 is shown. Headset 102 includes a processor 202 operably coupled via a bus 214 to a detector 204, a donned and doffed determination circuit 205, a memory 206, a transducer 208, an optional network interface 210, and an optional user interface 212.

Processor 202 allows for processing data, in particular managing data between detector 204, determination circuit 205, and memory 206 for determining the donned or doffed state of headset 102. In one example, processor 202 may also process information about access points, service providers, and service accounts for wireless headsets. In one example, processor 202 is a high performance, highly integrated, and highly flexible system-on-chip (SOC), including signal processing functionality such as echo cancellation/reduction and gain control in another example. Processor 202 may include a variety of processors (e.g., digital signal processors), with conventional CPUs being applicable.

Detector 204 includes a motion detector and/or a non-motion detector providing output charges based upon a headset characteristic such as kinetic energy, temperature, and/or capacitance.

In the case of a motion detector, as the user wears the headset, subtle movements of the head (e.g., from standing, sitting, walking, or running) cause movements of the headset, and detector 204 transfers kinetic energy from head and body movement into an electromotive force, or an output charge. In other words, motion of the headset induces a small fluctuating current flow in a nearby electrical conductor. Current in this conductor is amplified electronically. The output charges may be provided at predetermined or varying intervals (e.g., sampling every 5 seconds) and for predetermined or varying periods (e.g., based on time or number of samples) to form an output charge pattern.

Detector 204 is operably coupled to a determination circuit 205 for determining whether a plurality of the output charges form an output charge pattern corresponding to a state selected from the group consisting of the headset being donned and doffed. In one example, determination circuit 205 compares the output charge pattern to a predetermined profile, and if the pattern is within the bounds of the predetermined profile, the headset is considered to be in a state of being donned. When there is no recognized output charge pattern for a predetermined period, then the headset may be considered to be abandoned and in a state of being doffed. In another embodiment, the output charge pattern may be recognized as a doffed output charge pattern. The output charges may be shaped using a comparator circuit which is connected to an input pin on a general purpose microcontroller. Firmware in the microcontroller may implement a filtering algorithm to discriminate between movement of a headset when doffed and the occasional movements caused by relocating a non-worn headset from one location to another. In this example, determination circuit 205 is an individual component operably coupled to other components of headset 102 via bus 214, but determination circuit 205 may be placed in various places as shown by the dashed line connection, for example being integrated with processor 202 or detector 204, stored in memory 206, or being provided from outside of headset 102, for example at server 104.

In the case of a non-motion detector, as the user wears the headset, detector 204 transfers temperature and/or capacitance readings into an electromotive force, or an output charge. Current in this conductor is amplified electronically and processed as described above with respect to motion detectors. Again, the output charges may be provided at predetermined or varying intervals and for predetermined or varying periods to form an output charge pattern.

Memory 206 may include a variety of memories, and in one example includes SDRM, ROM, flash memory, or a combination thereof. Memory 206 may further include separate memory structures or a single integrated memory structure. In one example, memory 206 may be used to store passwords, network and telecommunications programs, and/or an operating system (OS). In one embodiment, memory 206 may store determination circuit 205, output charges and patterns thereof from detector 204, and predetermined output charge profiles for comparison to determine the donned and doffed state of a headset.

Transducer 208 may include an acoustic transducer, such as a microphone, a speaker, or a combination thereof, for transmission of sound (such as from the user's mouth or to the user's ear based upon signals from an audio source). Transducer 208 may also include a plurality of separate transducers for performing different functions. The transducer can be any type of electromagnetic, piezoelectric, or electrostatic type of driving element, or a combination thereof, or another form of driving element, for generating sound waves from the output face of the transducer. In one embodiment, the transducer may receive signals through wireless communication channels, such as by Bluetooth™ protocols and hardware, in one example.

Network interface 210 allows for communication with APs, and in one example includes a transceiver for communicating with a wireless local area network (LAN) radio transceiver (e.g., wireless fidelity (WiFi), Bluetooth, ultra wideband (UWB) radio, etc.) for access to a network (e.g., a wireless LAN or the Internet), or an adaptor for providing wired communications to a network. In one example, network interface 210 is adapted to derive a network address for the headset using the headset's electronic serial number, which is used to identify the headset on the network. In one embodiment, the electronic serial number may be the headset's Media Access Control (MAC) address; however, the electronic serial number may be any number that is mappable to a network address. Network interface 210 is adapted to communicate over the network using the network address that it derives for the headset. In one embodiment, network interface 210 is able to transmit and receive digital and/or analog signals, and in one example communicates over the network using IP, wherein the network interface uses the headset's MAC address or another globally unique address as its IP address. In particular, network interface 210 may be operably coupled to a network via the IEEE 802.11 protocol. However, the network interface 210 may communicate using any of various protocols known in the art for wireless or wired connectivity.

An example of an applicable network interface and the Internet protocol layers (and other protocols) of interest are described in pending U.S. patent application Ser. No. 10/091,905 filed Mar. 4, 2002, the full disclosure of which is hereby incorporated by reference for all purposes.

User interface 212 allows for manual communication between the headset user and the headset, and in one example includes an audio and/or visual interface such that a prompt may be provided to the user's ear and/or an LED may be lit.

Referring now to FIGS. 3 through 13, different embodiments of detector 204 are described. FIGS. 3 through 6 illustrate examples of motion detectors, and FIGS. 7 through 13 illustrate examples of non-motion.

Figure 3A:
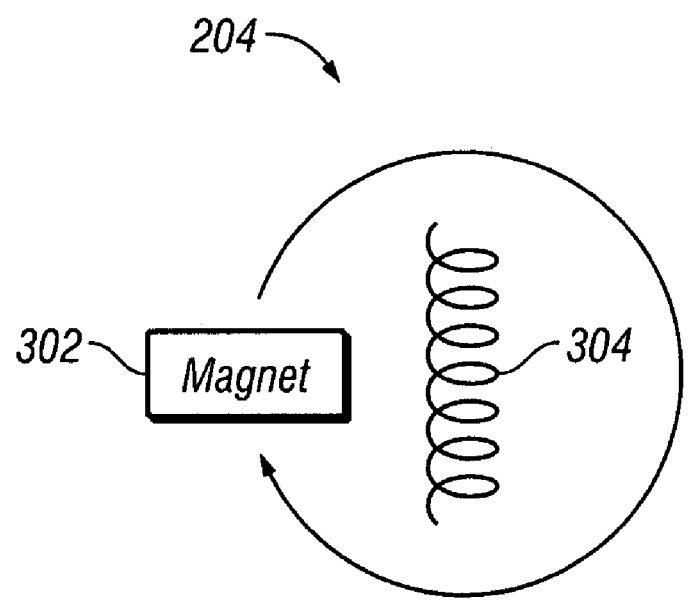
FIGS. 3 through 6 show different embodiments of a motion detector used in a headset.
Figure 3B:
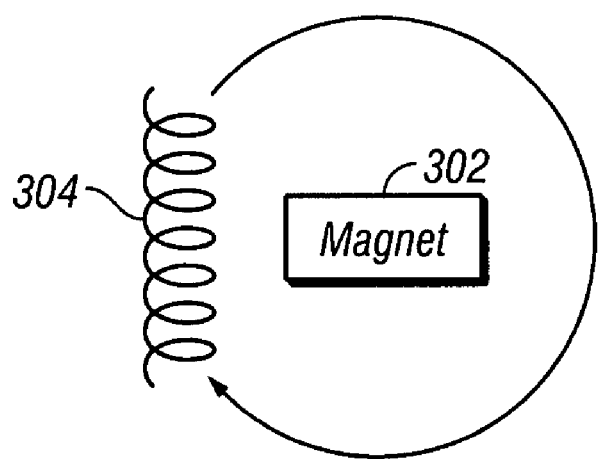

FIGS. 3A and 3B illustrate a magnet 302 and a conductor 304, such as a coil, that move relative to one another such that an output charge is generated in accordance with an embodiment. FIG. 3A illustrates a movable magnet 302 that moves relative to a fixed conductor 304, and FIG. 3B illustrates a movable conductor 304 that moves relative to a fixed magnet 302. The movable component may be hinged, suspended mechanically, or otherwise movably coupled so that gravity or inertia drives slight movement with respect to the headset whenever the headset wearer moves his head or body. In one example, the fixed magnet may be the same magnet used in a moving-coil transducer contained in the headset. The induced current in the conductive element is amplified, sent to a donned and doffed determination circuit (for example a part of a printed circuit board assembly), and processed as described above to determine a state of the headset.

Figure 3C:
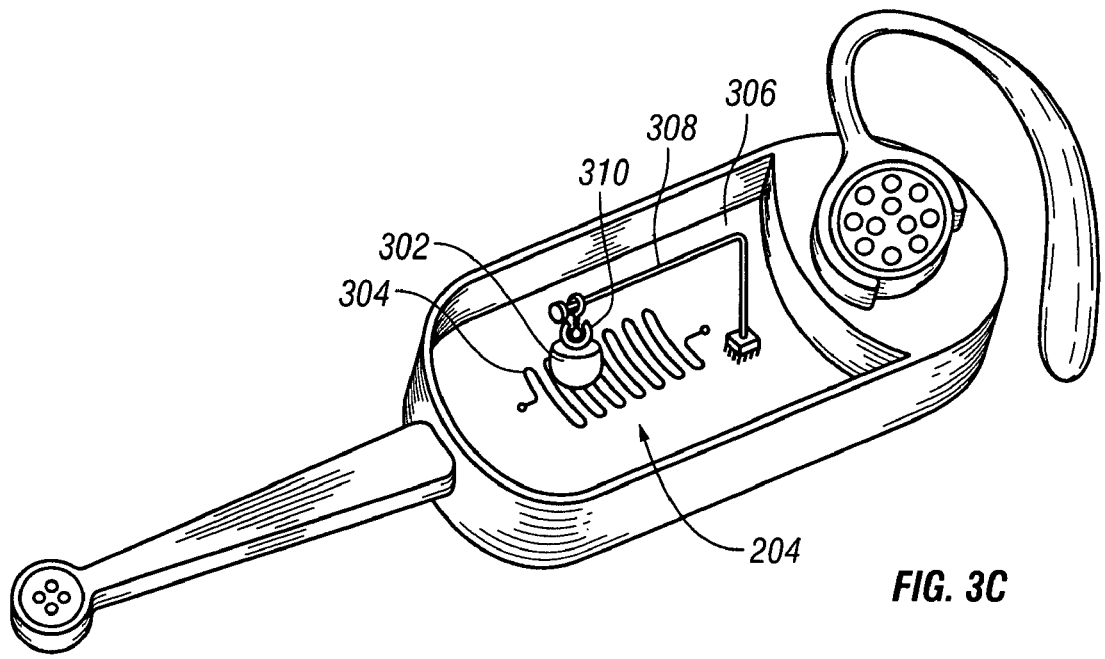
Figure 3D:
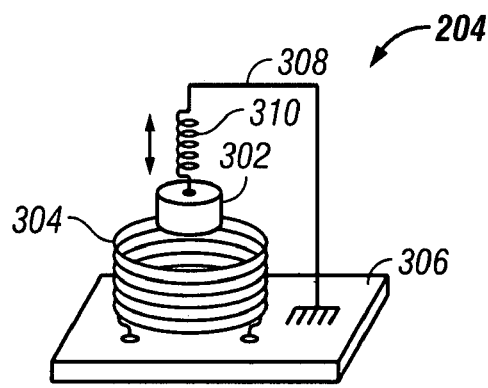
Figure 3E:
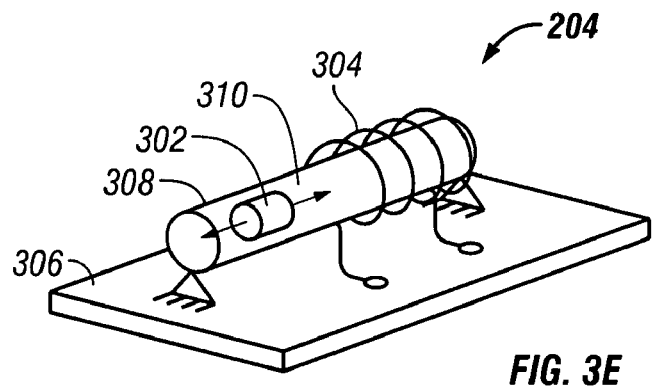

FIGS. 3C through 3E illustrate in more detail embodiments of magnet 302 movable with respect to a fixed conductor 304. FIGS. 3C, 3D, and 3E show a movable magnet 302 and a fixed conductor 304, which is operably coupled to a printed circuit board assembly (PCBA) 306.

In FIGS. 3C and 3D, magnet 302 is movably coupled to magnet support 308 via a joint 310, which allows magnet 302 to move in various directions relative to conductor 304. In FIG. 3C, joint 310 may include a ball-and-socket type joint slidably coupled along support 308 allowing magnet 302 to move over trace conductor 304. In FIG. 3D, joint 310 may include a spring that allows magnet 302 to move along an interior of coil conductor 304. In FIG. 3E, magnet 302 is movable within support 308, which is filled with a fluid 310, in one example a ferrofluid, allowing magnet 302 to move along an interior of coil conductor 304 that surrounds at least a portion of support 308.

Figure 3F:
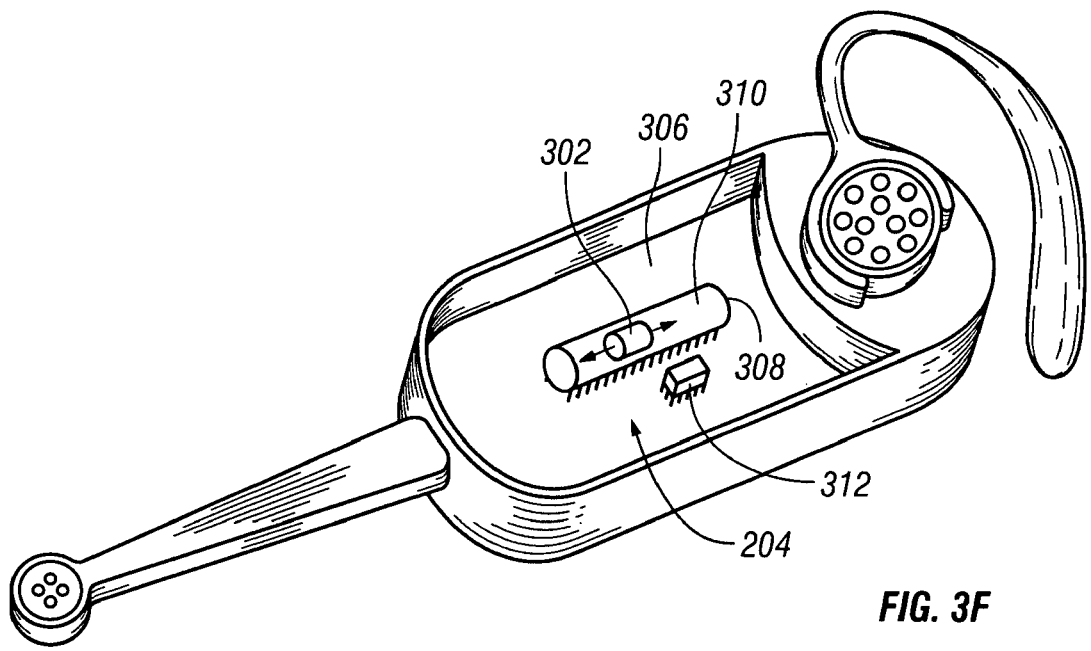

FIG. 3F shows a similar detector as in FIG. 3E, including magnet 302, PCBA 306, support 308, and fluid 310, but instead of conductor 304, a sensor 312 is positioned proximate to support 308 for sensing movement of magnet 302 (e.g., sensing if the magnet passes the sensor). In one example, with no intent to limit the invention thereby, sensor 312 may include a Hall effect sensor, a reed switch, and/or an optical switch.

Figure 4A:
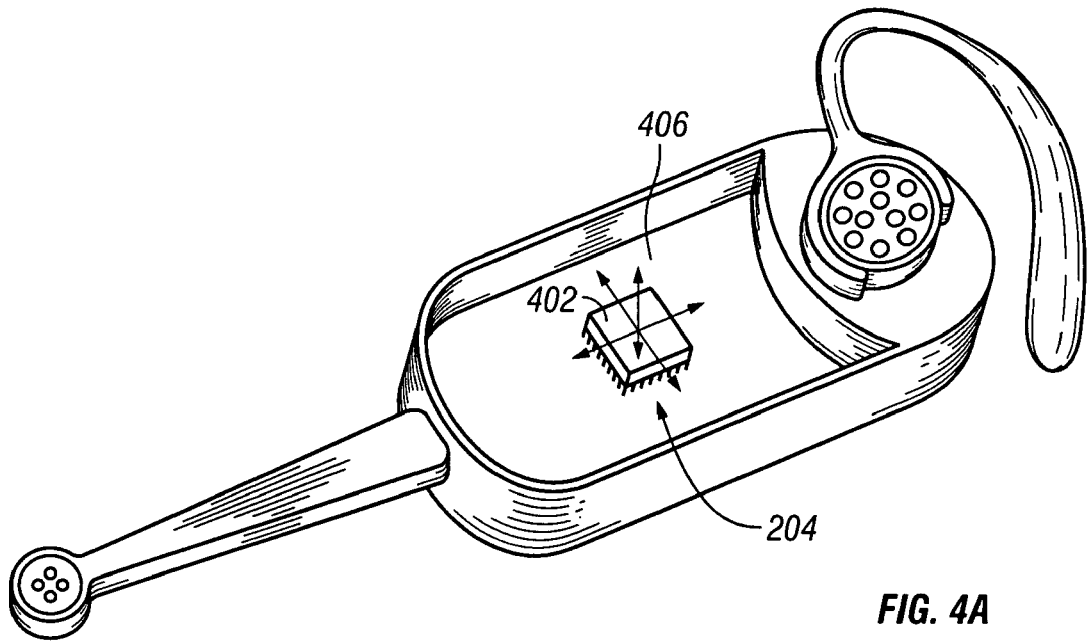

FIG. 4A illustrates an acceleration sensor 402 operably coupled to a PCBA 406 in accordance with an embodiment. In one example, acceleration sensor 402 includes a mass affixed to a piezoelectric crystal. The mass is coupled to a supporting base through the piezoelectric crystal. When the sensor is subjected to kinetic activity, the sensor experiences force due to the acceleration of the mass, thereby exerting a force on the crystal. This force results in an output charge of the crystal that is directly proportional to the input acceleration. The variations in force against the crystal resulting from the movements of the headset result in various output charges. The output charge is amplified, sent to a donned and doffed determination circuit, and processed as described above to determine a state of the headset.

Examples of applicable micro-electronic mechanical acceleration sensors, such as piezoelectric accelerometers, are dual and tri-axis accelerometers model series KXM and KXP, available from Kionix, Inc. of Ithaca, N.Y. Various piezoelectric crystal materials may be used for the accelerometer construction, such as ceramic lead metaniobate, lead zirconate, lead titanate, and natural quartz crystal. Various mechanical configurations of the masses and crystals may also be used, including but not limited to isolated compression, shear, and ring shear, to name a few.

In another embodiment, acceleration sensor 402 may include strain gauges in one or more axes of the headset, as illustrated in FIGS. 4B, 4B1, and 4B2. In one example, detector 204 includes a mass 420 coupled to an end of a flexible membrane 424 and thin electrical traces 422 (strain gauge element) on flexible membrane 424 and operably coupled to PCBA 406. FIGS. 4B1 and 4B2 illustrate membrane 424 flexing along opposite directions, respectively, as illustrated by the arrows. The flexing of membrane 424 effectively lengthens and thins (flexes, compresses, and/or elongates) the traces 422, increasing the resistance through the trace pattern. Kinetic energy from movement of the headset causes variations in the resistance of the trace pattern, thereby allowing for determination of a donned or doffed state of the headset.

Figure 5A:
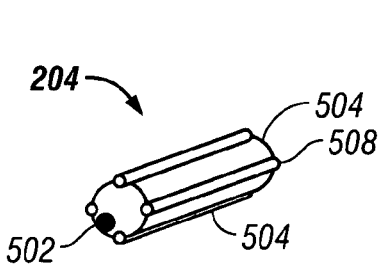
Figure 5B:
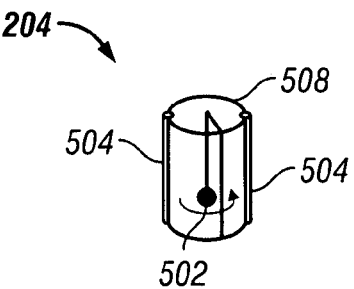

FIGS. 5A and 5B illustrate a detector 204 including a movable conductor 502 and a capsule 508 having electrical contacts 504 in accordance with an embodiment. FIG. 5A illustrates conductor 504 that is loosely contained within capsule 508, and FIG. 5B illustrates conductor 502 that is suspended within capsule 508. Conductor 502 is made of electrically conductive material and movable such that gravity and/or inertia causes conductor 502 to move with respect to the headset whenever the headset wearer moves the headset. Electrical contacts 504 are positioned within capsule 508 such that contact with movable conductor 502 causes an electric current or output charge to be produced, which is amplified, sent to a donned and doffed determination circuit, and processed as described above to determine a state of the headset.

In FIG. 5A, conductor 502 closes a circuit by bridging a gap between electrical contacts 504, allowing an electric current to flow intermittently. In FIG. 5B, conductor 502 is suspended from a pivot point inside the headset so that headset movement causes the conductor to move and touch contact points that surround the conductor, effectively closing and opening a circuit to thereby allow electric current to flow intermittently.

In another example, the electrical contacts may be configured in groups of two or more sets so that the motion of the weight in differing directions may be registered, thereby providing more data for determining the headset state. For example, a movable conductive mass is loosely contained in a housing that includes many contacts, such that movement of the mass opens and closes circuits as the mass makes and breaks contact with the housing contacts. The sensitivity of this detector can be tuned to detect the axis or direction of the movement, where alternate contacts are connected to different points on the circuit. Accordingly, this configuration can be arranged to determine when the user of the headset is shaking his or her head from side-to-side or nodding up and down, differentiating between the two motions by monitoring which circuit(s) are opening and closing, thereby allowing the user to input information into the headset, such as when responding to a call-answer prompt with a nod "yes" or shake of the head "no".

FIGS. 5C, 5C1, 5C2, and 5C3 illustrate in greater detail an embodiment of a detector 204 including a movable conductor 502 and a fixed capsule 508 having electrical contacts 504 operably coupled to a PCBA 506. Conductor 502 is freely movable within spherical capsule 508 (as shown by arrows in FIG. 5C1), and creates or closes different circuits 512 as conductor 502 makes contact with electrical contacts 504 (as shown by FIGS. 5C2 and 5C3).

Figure 6A:
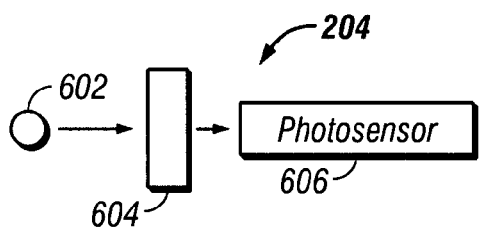
Figure 6B:
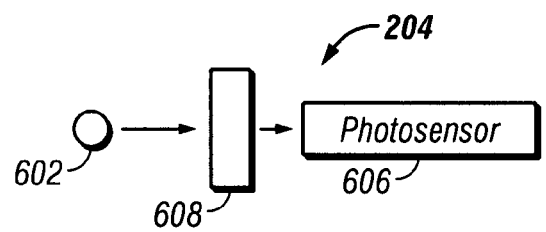

FIGS. 6A and 6B illustrate a detector 204 including a light source 602, a photosensor 606, and a movable reflective surface 604, 608 therebetween in accordance with an embodiment. FIG. 6A illustrates surface 604 that may be suspended, pinned, or loosely trapped, such that surface 604 at a rest state allows photosensor 606 to receive light from light source 602. Movement of the headset causes surface 604 to move such that photosensor 606 detects a change in the amount of light received and induces fluctuating current flow in a nearby electrical conductor. Alternatively, in FIG. 6B, surface 608 may be suspended, pinned, or loosely trapped, such that surface 608 at a rest state impedes light from reaching photosensor 606. Movement of the headset causes surface 608 to move such that photosensor 608 detects a change in the amount of light received and induces fluctuating current flow in a nearby electrical conductor. The current flow or output charge produced is amplified, sent to a donned and doffed determination circuit, and processed as described above to determine a state of the headset. In yet another example, surface 604, 608 could include a hole through which light from light source 602 travels, thereby providing changed amount of light received by photosensor 606 as the surface 604, 608 moves as the headset is moved.

As noted above, detector 204 may include a non-motion detector that provides output charges based upon a headset characteristic such as temperature and/or capacitance. When a headset is properly worn, several surfaces of the headset touch or are in operable contact with the user. These touch/contact points can be monitored and used to determine the donned or doffed state of the headset.

Figure 7:
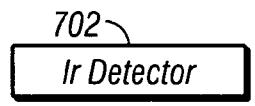
FIGS. 7 through 13 show different embodiments of a non-motion detector used in a headset.

FIG. 7 illustrates an infra-red (IR) detector 702 that is sensitive to the temperature of a human body. Humans having a skin temperature of about 93 degrees Fahrenheit, radiate infra-red energy with a wavelength between about 9 and 10 micrometers. Therefore, the IR detector may be configured to be sensitive in the range of 8 to 12 micrometers, and may be positioned to aim at a point where the headset is intended to contact a user's skin, such as the user's skin or hair. When the headset user dons the headset, the IR detector 702 detects radiation in the wavelengths between 9 and 10 micrometers and provides an electrical signal or output charge that is amplified, sent to a donned and doffed determination circuit, and processed as described above to determine a state of the headset.

Figure 8A:
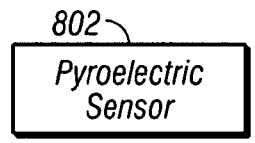
Figure 8B:
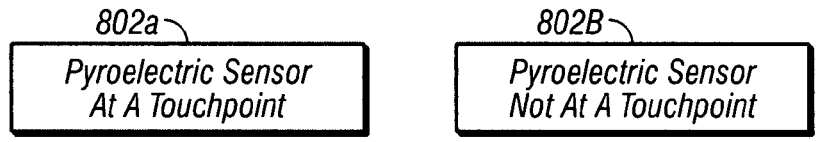

FIGS. 8A and 8B illustrate a pyroelectric sensor 802 that is positioned in close proximity to a point where the headset is intended to contact a user's skin. The sensor detects a user is present by determining a skin temperature near 93 degrees Fahrenheit and then providing an electrical signal or output charge that is amplified, sent to a donned and doffed determination circuit, and processed as described above to determine a state of the headset. As shown in FIG. 8B, two pyroelectric sensors 802a and 802b may be used, with one sensor positioned close to a contact point and the other positioned in a location away from a contact point. Differences (a delta) between the readings of the two sensors can be used to determine a donned or doffed state of the headset, for example if the delta of the two temperature readings is at or above a predetermined level.

Figure 9:
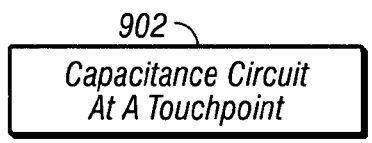

FIG. 9 illustrates an electronic circuit 902 sensitive to capacitance positioned in close proximity to a point where the headset is intended to contact a user's skin. The circuit detects an increase in capacitance when the headset is worn and provides an output charge that is amplified, sent to a donned and doffed determination circuit, and processed as described above to determine a state of the headset.

Figure 10:
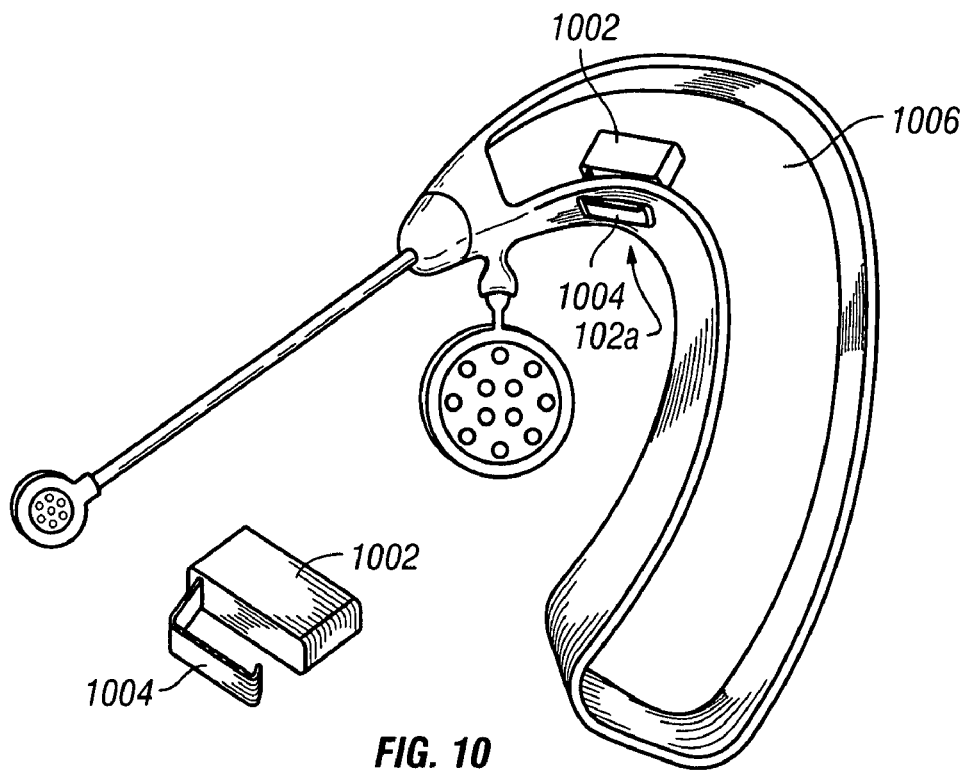

Other detectors that may be used at a touch point include micro-switches, as shown in FIG. 10. A micro-switch 1002 can be housed and operably coupled to a PCBA 1006 within the headset device such that an actuator 1004 of the switch is positioned at a touch point 102a of the headset, thereby being depressed when the headset is worn. A determination circuit in PCBA 1006 can monitor the state of the switch, thereby determining the state of the headset.

Figure 11:
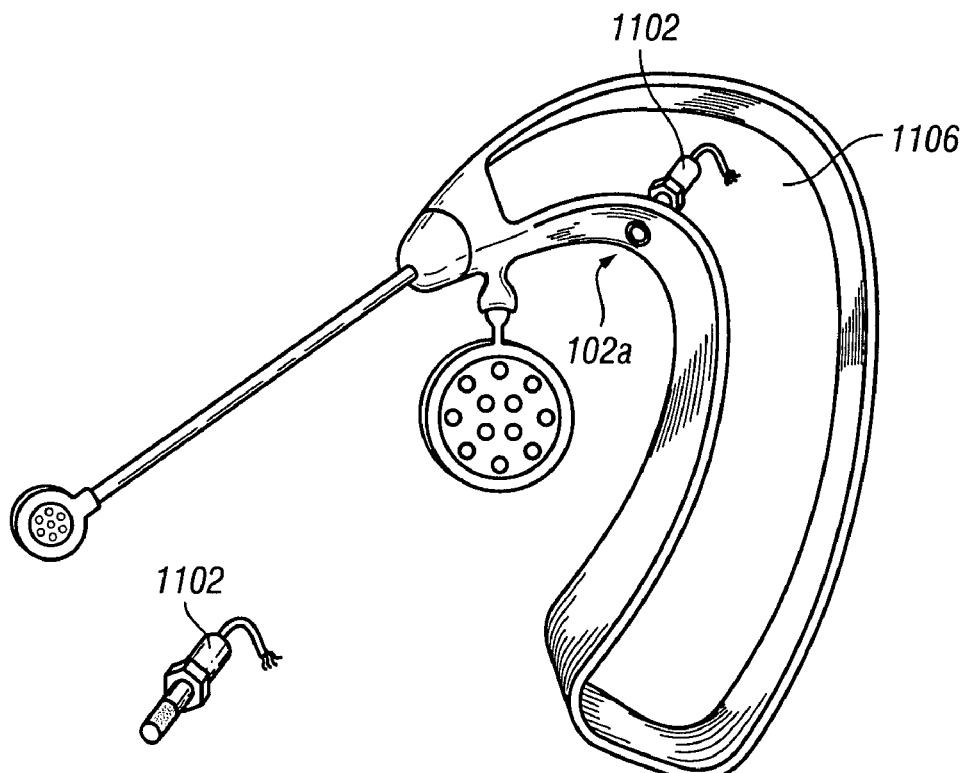

Another detector that may be used includes an inductive proximity sensor 1102, as shown in FIG. 11. A proximity switch 1102 can be housed and operably coupled to a PCBA 1106 within the headset device such that the switch 1102 is positioned at a touch point 102a of the headset, thereby being triggered or activated when the headset is worn. This use of a proximity switch does not require force from the user's skin, but proximity to the user (without consistent force) such that a change in magnetic field is detected is sufficient to trigger the sensor. A determination circuit in PCBA 1106 can monitor the state of the switch, discriminating between a donned or doffed state of the headset.

Figure 12:
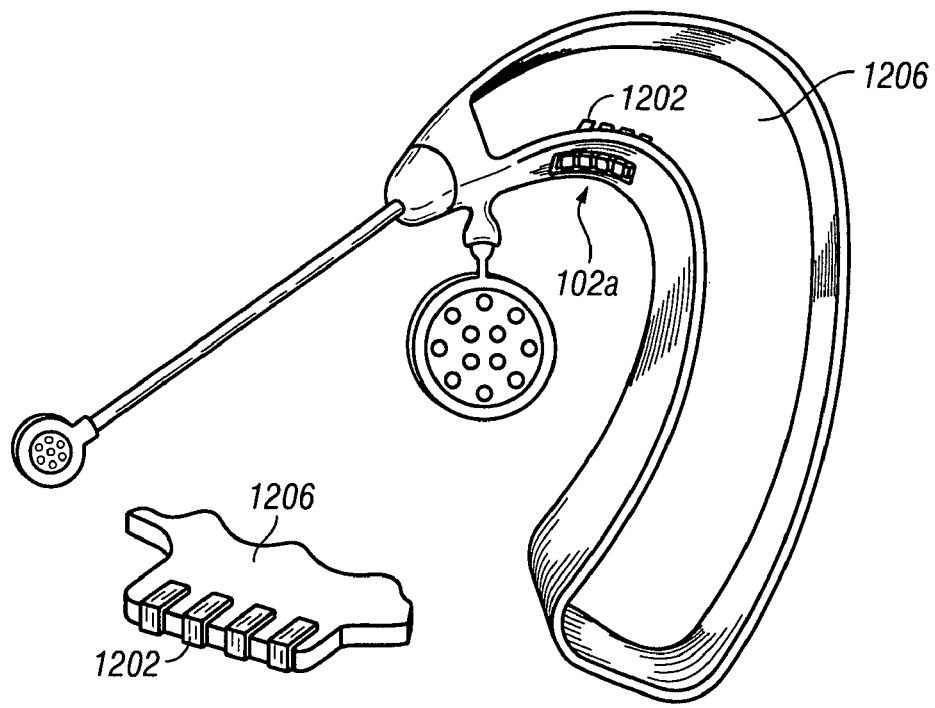

Yet another detector that may be used includes a skin resistivity sensor 1202, as shown in FIG. 12. Conductive materials 1202 can be used at two or more touch points 102a on the headset, and a circuit in PCBA 1206 can monitor the resistance between these conductive materials, thereby detecting a resistance that is consistent with a predetermined range, thus discriminating between a donned and a doffed state of the headset. That is, when the two or more contact points are in contact with the user's skin, the resistance reading between these contact points will be different from when the headset is not worn, for example the resistance being reduced when the headset is worn due to the skin adding conductance.

Figure 13:
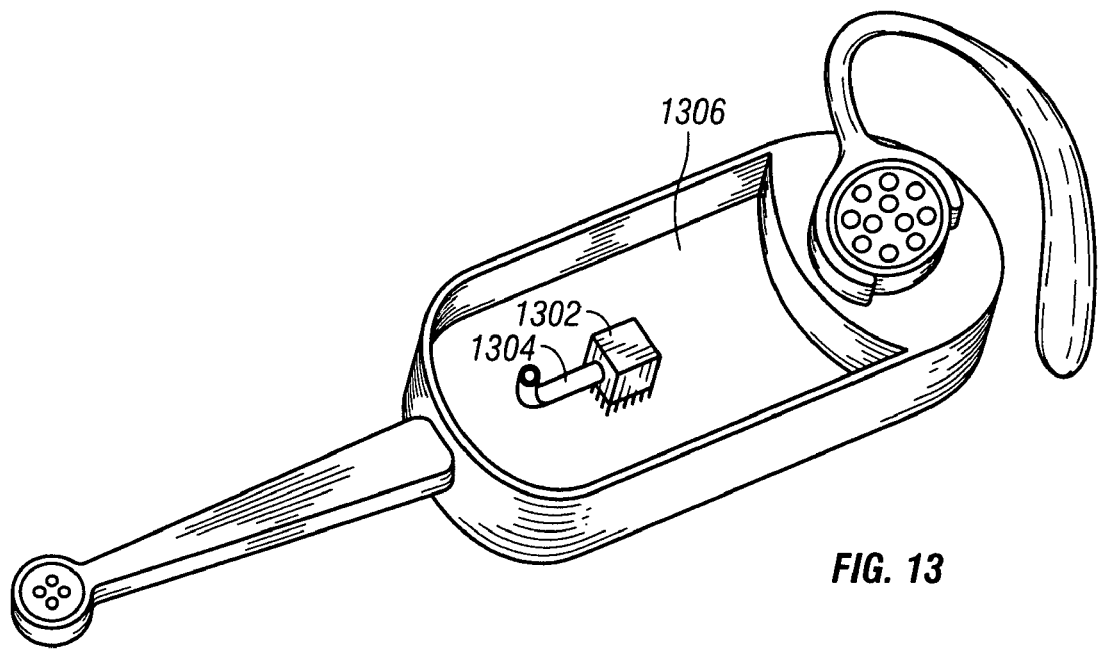

Referring now to FIG. 13, another detector that may be utilized includes a carbon dioxide ($CO_2$) sensor 1302 operably coupled to a PCBA 1306 and a channel 1304 in accordance with an embodiment. Sensor 1302 is able to detect an increase of $CO_2$, thereby inferring a donned state of a headset. In one embodiment, sensor 1302 is able to subtract background $CO_2$ levels to more accurately discriminate between donned and doffed states, and in another embodiment, sensor 1302 and a determination circuit are able to detect patterns of $CO_2$ levels correlating to human breathing patterns.

It is noted that a variety of detectors that provide an output charge pattern corresponding to a donned or doffed state of a headset are within the scope of the present invention.

In critical applications, two or more of the embodiments described above may be used in one headset in order to determine a donned or doffed headset state with greater accuracy and reliability. For example, in one case with one motion detector and one non-motion detector being used, a headset state can be indicated when both detectors indicate the same state.

Figure 14:
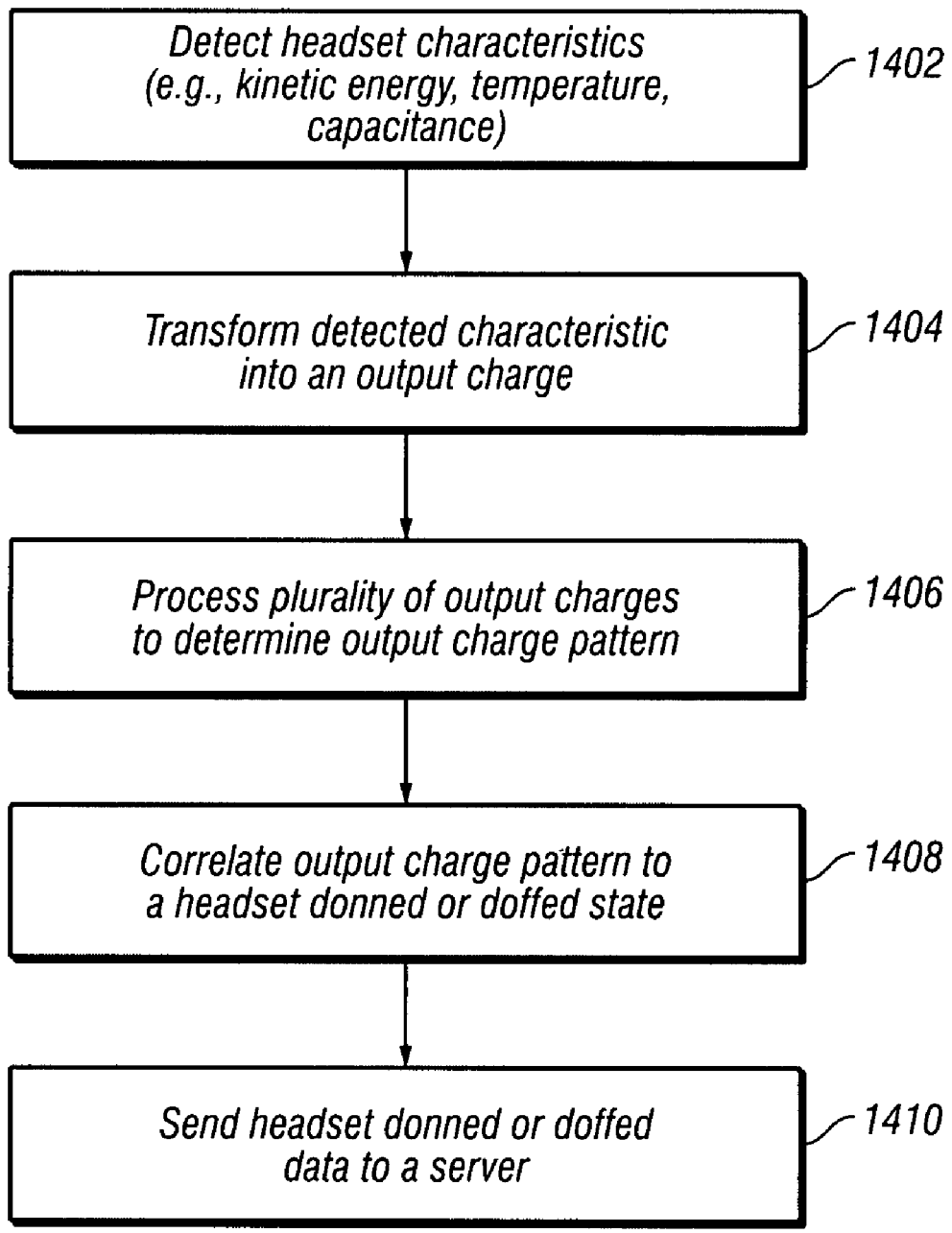
FIG. 14 is a flowchart showing a method of determining a donned or doffed state of a headset.

Referring now to FIG. 14 in conjunction with FIGS. 1 and 2, a flowchart of a method for determining the donned or doffed state of a headset is illustrated in accordance with an embodiment. At step 1402, a headset characteristic, such as kinetic energy, temperature, and/or capacitance, is detected by a detector 204. At step 1404, the detector provides an output charge corresponding to a detected characteristic. The output charge is amplified and transferred to determination circuit 205. At step 1406, a plurality of output charges are processed by determination circuit 205 to determine an output charge pattern. At step 1408, determination circuit 205 correlates the output charge pattern to a donned or doffed state of a headset, in one example comparing the output charge pattern to predetermined output charge profiles that reflect a donned or doffed state of a headset. The predetermined output charge profiles may be in look-up tables or a database and may include a variety of parameters, such as for particular headsets and detectors being used. At step 1410, the headset state may be sent to server 104 for routing of calls or messages, or for notifying a system regarding volume control for hearing impaired use.

Further discussion regarding the use of sensors or detectors to detect a donned or doffed state can be found in the commonly assigned and co-pending U.S. patent application entitled "Donned and Doffed Headset State Detection", which was filed on Oct. 2, 2006, and which is hereby incorporated into this disclosure by reference.

Figure 15A:
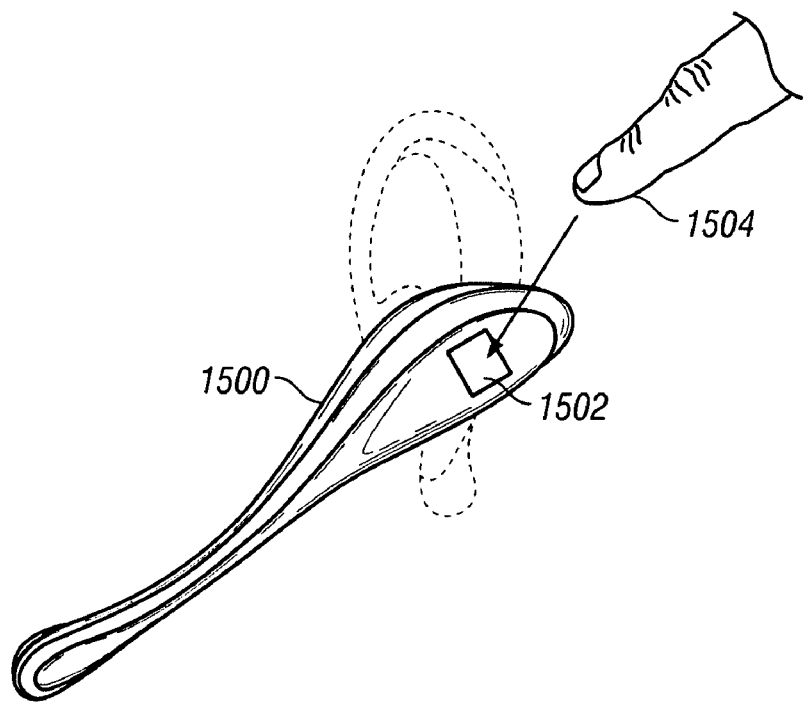
FIG. 15A illustrates a headset capable of indicating a donned or doffed state and capable of performing user validation utilizing a fingerprint scan and identification in one example of the invention.

FIG. 15A illustrates a headset 1500 capable of indicating a donned or doffed state and capable of performing user validation utilizing a fingerprint scan and identification in one example of the invention. Headset 1500 includes a finger pad 1502 on the exterior of the headset on which the fingerprint of a finger 1504 of a headset user is placed during a validation process. Finger pad 1502 is positioned on the exterior of the headset in such a manner that at least a part of a fingerprint portion lies flat upon the finger pad during user validation.

Figure 15B:
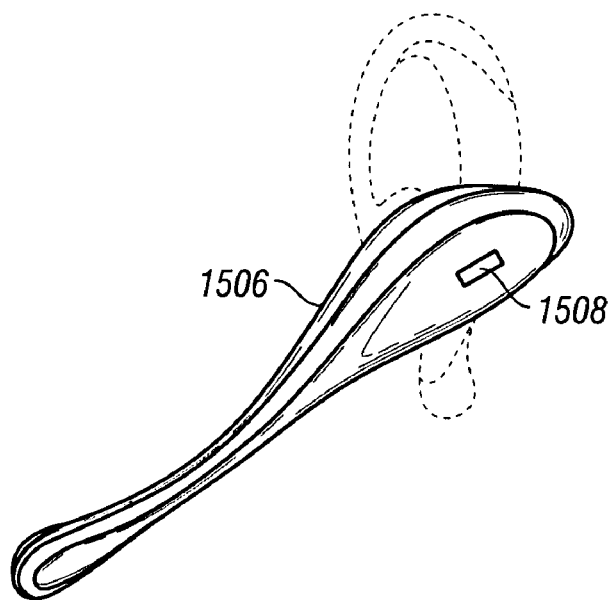
FIG. 15B illustrates a headset capable of indicating a donned or doffed state and capable of performing user validation utilizing a fingerprint scan and identification in a further example of the invention, wherein the fingerprint scan is performed with a line scanner.

FIG. 15B illustrates a headset 1506 capable of indicating a donned or doffed state and capable of performing user validation utilizing a fingerprint scan and identification in a further example of the invention, wherein the fingerprint scan is performed with a line scanner. Headset 1506 includes a finger pad in the form of a narrow finger strip 1408 on which a user finger is placed and scanned by the user "wiping" his finger across a scanning surface. During optical scanning, the user slides his or her finger across the scanning surface, whereby the line scanner images the finger line by line as it is slid across the scanning surface.

Figure 16:
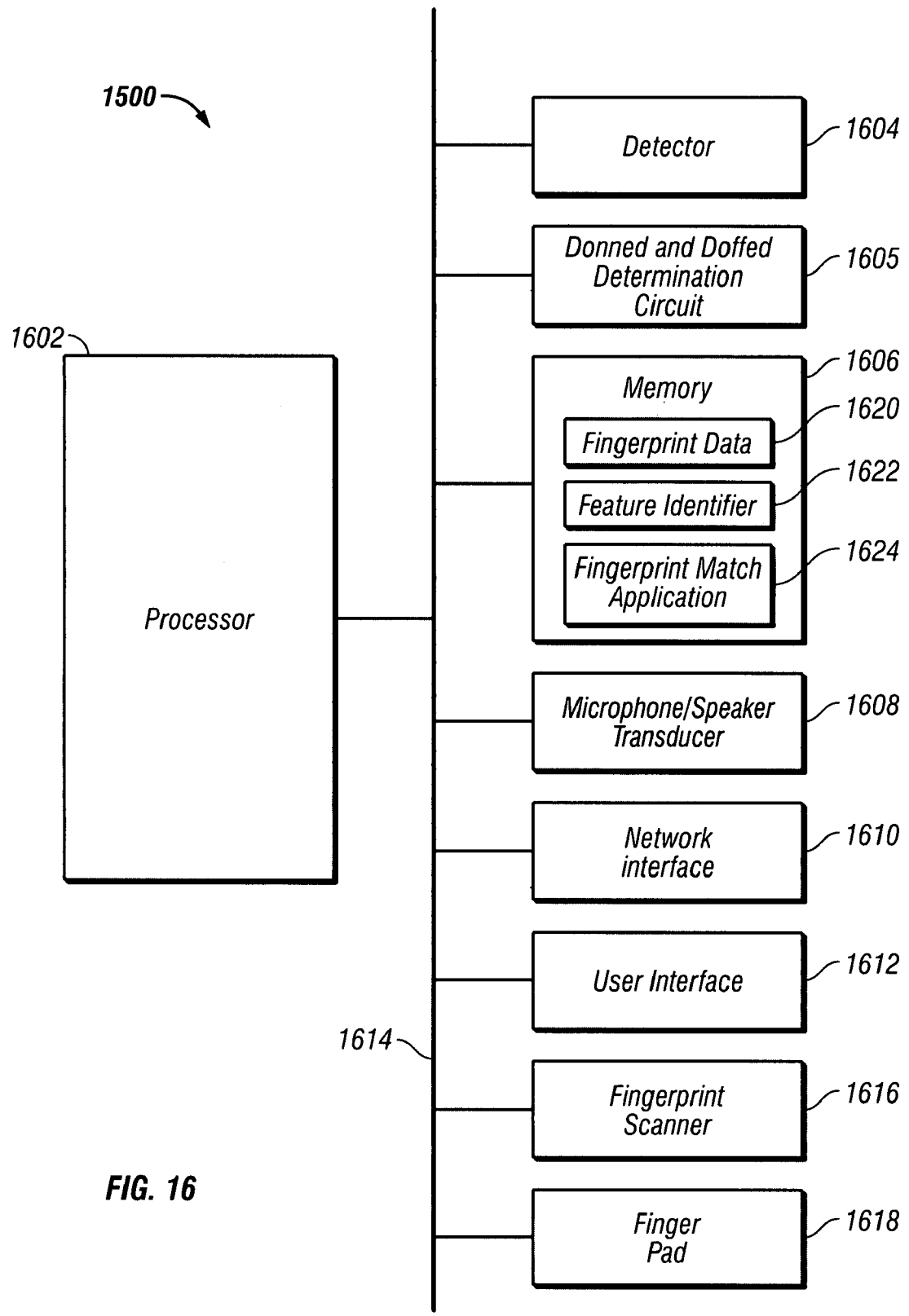
FIG. 16 illustrates a simplified block diagram of the components of the headset shown in FIG. 15A or 15B.

FIG. 16 illustrates a simplified block diagram of the components of the headset shown in FIG. 15A or 15B. In one example, the headset does not rely on server-based voice technologies, whose accuracy can be limited. The headset 1500 (or 1506) includes a processor 1602 operably coupled via a bus 1614 to a detector 1604, a donned and doffed determination circuit 1605, a memory 1606, a transducer 1608, an optional network interface 1610, and an optional user interface 1612. The headset 1500 further includes a fingerprint scanner 1616 and a finger pad 1618. Fingerprint scanner 1616 is properly aligned and integrated with finger pad 1618 within the headset housing.

Memory 1606 includes previously stored fingerprint data 1620 corresponding to validated users, a feature identifier application 1622 for analyzing scanned fingerprint scan data, and a fingerprint match application 1624 for comparing the analyzed scanned fingerprint scan data to previously stored fingerprint data 1620. Although shown as separate applications, feature identifier application 1622 and fingerprint match application 1624 may be integrated into a single application. Feature identifier application 1622 identifies fingerprint features to uniquely identify a user. Memory 1606 may include a variety of memories, and in one example includes SDRM, ROM, flash memory, or a combination thereof. Memory 1606 may further include separate memory structures or a single integrated memory structure. In one example, memory 1606 may be used to store passwords, network and telecommunications programs, and/or an operating system (OS). In one embodiment, memory 1606 may store determination circuit 1605, output charges and patterns thereof from detector 1604, and predetermined output charge profiles for comparison to determine the donned and doffed state of a headset.

Processor 1602, using executable code and applications stored in memory, performs the necessary functions associated with headset operation described herein. Processor 1602 allows for processing data, in particular managing data between detector 1604, determination circuit 1605, and memory 1606 for determining the donned or doffed state of headset 1500 or 1506, and determining whether the state of the headset has switched from being doffed to donned. Processor 1602 further processes fingerprint scan data received from fingerprint scanner 1616 using feature identifier application 1622 and fingerprint match application 1624. In one example, processor 1602 is a high performance, highly integrated, and highly flexible system-on-chip (SOC), including signal processing functionality such as echo cancellation/reduction and gain control in another example. Processor 1602 may include a variety of processors (e.g., digital signal processors), with conventional CPUs being applicable.

The structure and operation of detector 1604 and donned and doffed determination circuit 1605 are as described herein above in reference to FIG. 2. For example, detector 1604 may be a motion detector. The motion detector may take a variety of forms such as, for example, a magnet and a coil moving relative to one another, or an acceleration sensor having a mass affixed to a piezoelectric crystal. The motion detector may also be a light source, a photosensor, and a movable surface therebetween. In further examples, the detector may include one or more of the following: an infra-red detector, a pyroelectric sensor, a capacitance circuit, a micro-switch, an inductive proximity switch, a skin resistance sensor, or at least two pyroelectric sensors for determining a difference in temperature readings from the two pyroelectric sensors.

In one example the headset continuously monitors donned and doffed status of the headset. Upon detection that the headset is in a newly donned status, the user validation process begins. The structure and operation of transducer 1608 and network interface 1610 in one example are substantially similar to that described herein above in reference to FIG. 2.

User interface 1612 allows for manual communication between the headset user and the headset, and in one example includes an audio and/or visual interface such that an audio prompt may be provided to the user's ear and/or an LED may be lit. For example, the prompt may inform the user to place his or her finger on the finger pad to perform a fingerprint scan, or the prompt may be used to inform the user that the validation has been successful or it has failed.

Figure 17:
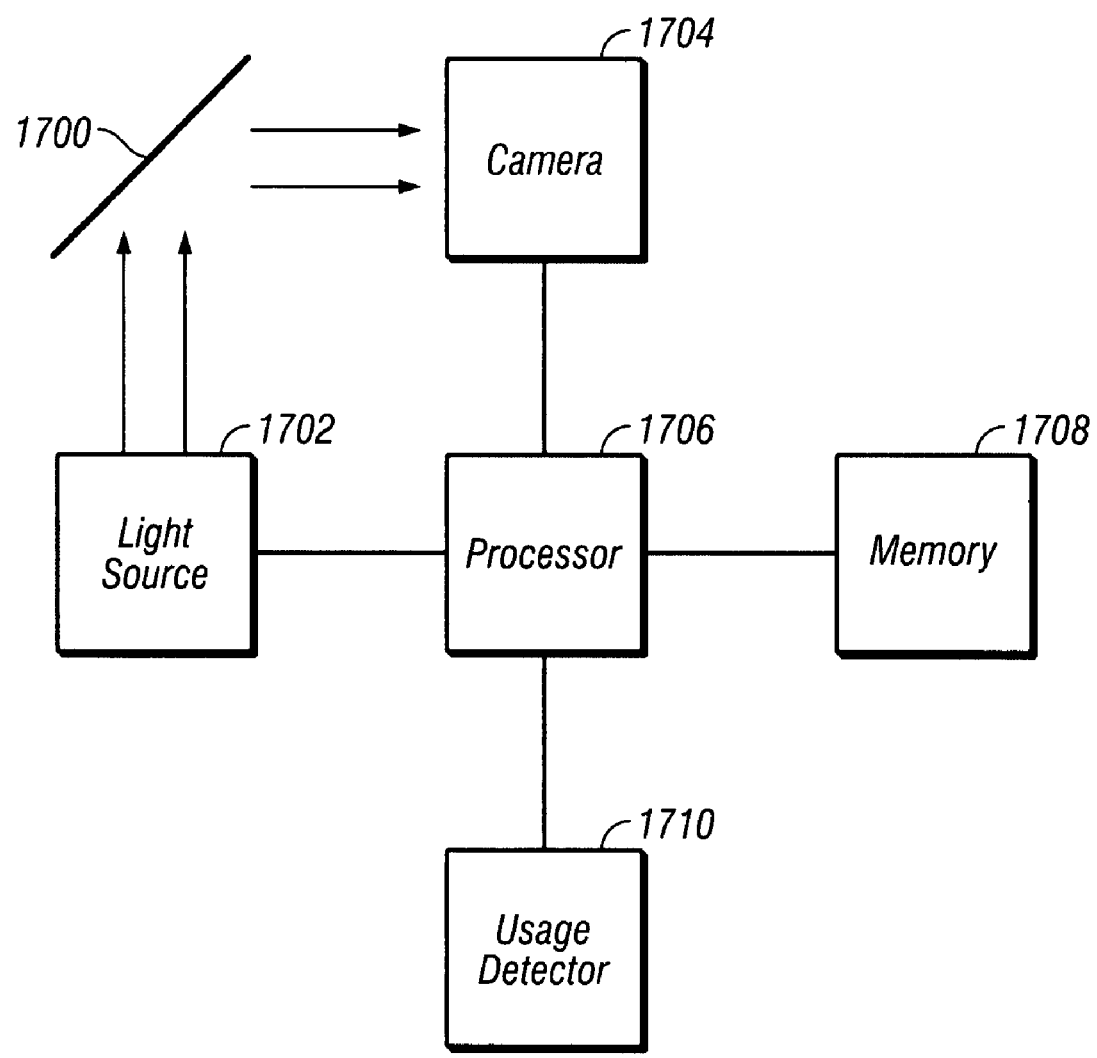
FIG. 17 illustrates a simplified block diagram of the headset shown in FIG. 16, wherein the fingerprint scanner is an optical scanner

FIG. 17 illustrates a simplified block diagram of the headset shown in FIG. 16, wherein the fingerprint scanner 1616 is an optical scanner. In this example, the fingerprint scanner 1616 includes a light source 1702 and camera 1704. Camera 1704 is, for example, a charge coupled device (CCD) such as a CMOS square pixel array.

In one example, light source 1702 is an array of light emitting diodes which illuminate the ridges of a finger placed on finger pad 1700. Finger pad 1700 may for example, be a transparent surface such as glass. The CCD is an array of light sensitive diodes which generate an electrical signal in response to light which hits a particular pixel. Examples of optical scanners include, without limitation, image sensors, line scanners, planar scanners, CMOS sensors, and contact image sensors. In operation, light generated by light source 1702 is directed to the finger pad 1700 to illuminate the fingerprint, and then reflected to camera 1704, which captures the reflected image. The captured image is processed by processor 1706, and compared to a previously stored fingerprint in memory 1708 of the valid user. In one example, the validation process is initiated when usage detector 1710 determines that the headset is donned.

In a further example of the invention, fingerprint scanner 1616 is a capacitance scanner. For example, fingerprint scanner 1616 is a chip sensor made up of an array of tiny cells which based on the distribution of capacitances and electric fields, obtains a topographic image of the fingerprint. Each cell includes two conductor plates. During the scan process, a finger ridge will result in a different voltage output than a finger valley. The scanner processor reads the voltage output for each cell in the sensor array, and determines whether the output is a ridge or a valley. Processor 1706 compares the scanned fingerprint data with previously stored data by comparing specific features of the fingerprint to determine whether the pattern of ridges and valleys in the scanned fingerprint data match the ridges and valleys in the stored validated fingerprint data. For example, examination of where ridge lines terminate or bifurcate may be examined and compared.

Figure 18A:
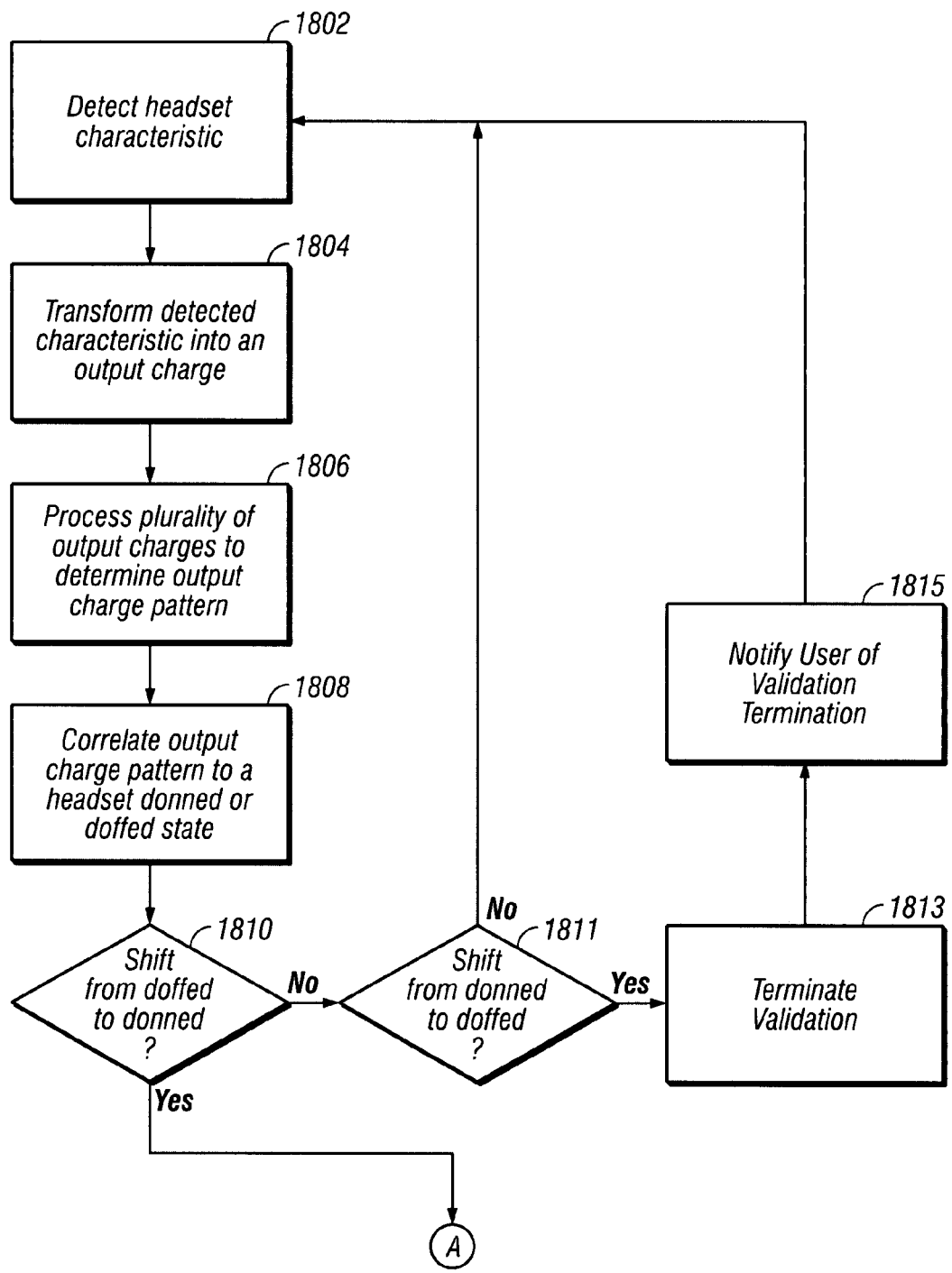
FIGS. 18A and 18B are a flowchart illustrating an exemplary process by which the system in FIG. 16 operates to validate the headset user.
Figure 18B:
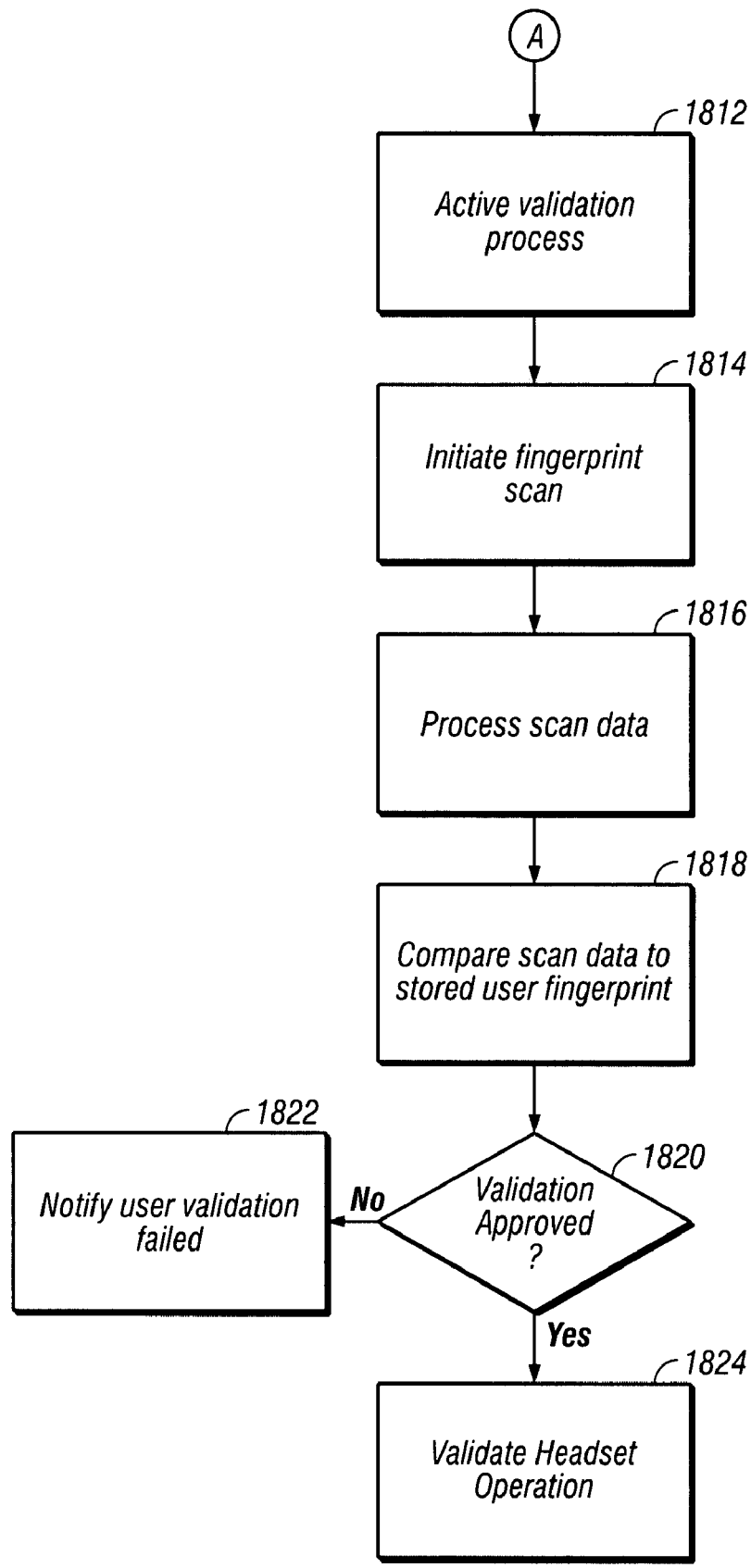

FIGS. 18A and 18B are a flowchart illustrating an exemplary process by which the system in FIG. 16 operates to validate the headset user. At block 1802, a headset characteristic, such as kinetic energy, temperature, and/or capacitance, is detected by a detector 204. At block 1804, the detector provides an output charge corresponding to a detected characteristic. The output charge is amplified and transferred to determination circuit 205. At block 1806, a plurality of output charges are processed by determination circuit 1605 to determine an output charge pattern. At block 1808, determination circuit 1605 correlates the output charge pattern to a donned or doffed state of a headset, in one example comparing the output charge pattern to predetermined output charge profiles that reflect a donned or doffed state of a headset. The predetermined output charge profiles may be in look-up tables or a database and may include a variety of parameters, such as for particular headsets and detectors being used. In one example, at decision block 1810, the headset controller determines whether the headset has shifted from a doffed state to a donned state. If no at decision block 1810, then at decision block 1811, it is determined whether the headset has shifted from a donned state to a doffed state. If yes at decision block 1811, validation of the headset is terminated at block 1813. Upon termination of validation, any headset functions requiring validation are locked/disabled and the user may be notified of the termination at block 1815. In this manner, unauthorized use of the headset is prevented. Following block 1815, the process returns to block 1802. If no at decision block 1811, the process returns to block 1802.

If yes at decision block 1810, then at block 1812 the user validation process is activated. In additional example processes, the validation process is activated upon detection of a donned status where validation has not previously occurred. For example, the validation process may be activated upon powering on of the headset and donning or while donned. In further examples, timing of the validation process upon DON detection in relation to headset usage may be varied.

Once the validation process has been activated, at block 1814, a fingerprint scan is initiated to obtain fingerprint scan data. At block 1816, the scan data is processed. At block 1818, the scan data is compared to previously stored user fingerprint data to identify whether there is a match. At decision block 1820, it is determined whether the user validation is approved based upon whether there is a match between the scanned fingerprint data and the stored user fingerprint data. If no at decision block 1820, then at block 1822 the user is notified of validation failure. If yes at decision block 1820, then at block 1824 the headset operation is validated and any headset functions requiring validation are unlocked and available for use. The process then returns to block 1802. In one example, only select headset functions (e.g., access to user information, use of headset to access an automated teller machine, etc.) require validation for use while other headset functions (e.g., basic voice communications) are operational irrespective of whether the headset is in a validated or not validated state. In a further example, all headset functions are locked when the headset is not in a validated state.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, the methods and systems described herein may be applied to other body worn devices in addition to headsets. Furthermore, the functionality associated with any blocks described above may be centralized or distributed. It is also understood that one or more blocks of the headset may be performed by hardware, firmware or software, or some combinations thereof. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A headset comprising:
   a detector providing an output indicating a donned or doffed condition;
   a memory storing a fingerprint data of an authorized headset user;
   a finger pad on an exterior of the headset on which a fingerprint of a headset wearer is placed during a validation process;
   a fingerprint scanner for generating a fingerprint scan upon detecting a state change from a doffed condition to a donned condition; and
   a processor for processing the fingerprint scan to validate an identity of a headset user.

2. The headset of claim 1, wherein the fingerprint scanner comprises an optical fingerprint scanner.

3. The headset of claim 2, wherein the optical fingerprint scanner comprises a charge coupled device and an internal light source.

4. The headset of claim 1, wherein the fingerprint scanner comprises a capacitance scanner.

5. The headset of claim 4, wherein the capacitance scanner comprises a semiconductor chip sensor.

6. The headset of claim 1, wherein the fingerprint scanner comprises a line scanner.

7. The headset of claim 1, wherein the detector comprises a motion detector.

8. The headset of claim 7, wherein the motion detector includes a magnet and a coil moving relative to one another.

9. The headset of claim 7, wherein the motion detector includes an acceleration sensor having a mass affixed to a piezoelectric crystal.

10. The headset of claim 7, wherein the motion detector includes a light source, a photosensor, and a movable surface therebetween.

11. The headset of claim 1, wherein the detector comprises one selected from the group consisting of an infra-red detector, a pyroelectric sensor, a capacitance circuit, a microswitch, an inductive proximity switch, a skin resistance sensor, and at least two pyroelectric sensors for determining a difference in temperature readings from the two pyroelectric sensors.

12. A method for validating the identity of a headset wearer comprising:
    detecting kinetic energy, temperature or capacitance to determine a headset characteristic;
    processing the headset characteristic to determine a donned or doffed condition;
    generating a fingerprint scan using a headset fingerprint scanner, and
    processing the fingerprint scan to validate an identity of a headset wearer.

13. The method of claim 12, further comprising determining whether a headset state has shifted from a doffed condition to a donned condition.

14. The method of claim 12, further comprising storing an authorized headset wearer fingerprint in a headset memory.

15. The method of claim 12, wherein processing the fingerprint scan to validate the identity of a headset wearer comprises comparing the fingerprint scan to a previously stored authorized headset wearer fingerprint.

16. The method of claim 12, wherein the headset fingerprint scanner comprises an optical fingerprint scanner.

17. The method of claim 16, wherein the optical fingerprint scanner comprises a charge coupled device and an internal light source.

18. The method of claim 12, wherein the headset fingerprint scanner comprises a capacitance scanner.

19. The method of claim 18, wherein the capacitance scanner comprises a semiconductor chip sensor.

20. The method of claim 12, wherein the headset fingerprint scanner comprises a line scanner.

21. The method of claim 12, further comprising entering a validated state upon validation of the identity of the headset wearer.

22. The method of claim 12, further comprising terminating a validated state upon determination of a doffed condition.

23. A headset comprising:
    a detector means for providing an output indicating a donned or doffed condition;
    a memory means storing a fingerprint data of an authorized headset user;
    a surface means for receiving a fingerprint of a headset wearer during a validation process;
    a fingerprint scanning means for generating a fingerprint scan upon detecting a state change from a doffed condition to a donned condition; and
    a processing means for processing the fingerprint scan to validate an identity of a headset user.

24. The headset of claim 23, wherein the detector means comprises a motion detecting means for detecting headset movement.

25. A headset comprising:
    a detector providing an output indicating a donned or doffed condition;
    a memory storing a fingerprint data of an authorized headset user;
    a fingerprint scanner for generating a fingerprint scan upon detecting a donned condition;
    a finger pad on an exterior of the headset on which a fingerprint of a headset wearer is placed during a validation process; and
    a processor for processing the fingerprint scan to validate an identity of a headset user.

26. The headset of claim 25, wherein the fingerprint scanner comprises an optical fingerprint scanner.

27. The headset of claim 26, wherein the optical fingerprint scanner comprises a charge coupled device and an internal light source.

28. The headset of claim 25, wherein the fingerprint scanner comprises a capacitance scanner.

29. The headset of claim 28, wherein the capacitance scanner comprises a semiconductor chip sensor.

30. The headset of claim 25, wherein the fingerprint scanner comprises a line scanner.

31. The headset of claim 25, wherein the detector comprises a motion detector.

32. The headset of claim 31, wherein the motion detector includes a magnet and a coil moving relative to one another.

33. The headset of claim 31, wherein the motion detector includes an acceleration sensor having a mass affixed to a piezoelectric crystal.

34. The headset of claim 31, wherein the motion detector includes a light source, a photosensor, and a movable surface therebetween.

35. The headset of claim 25, wherein the detector comprises one selected from the group consisting of an infra-red detector, a pyroelectric sensor, a capacitance circuit, a microswitch, an inductive proximity switch, a skin resistance sensor, and at least two pyroelectric sensors for determining a difference in temperature readings from the two pyroelectric sensors.

* * * * *